Figure 1:
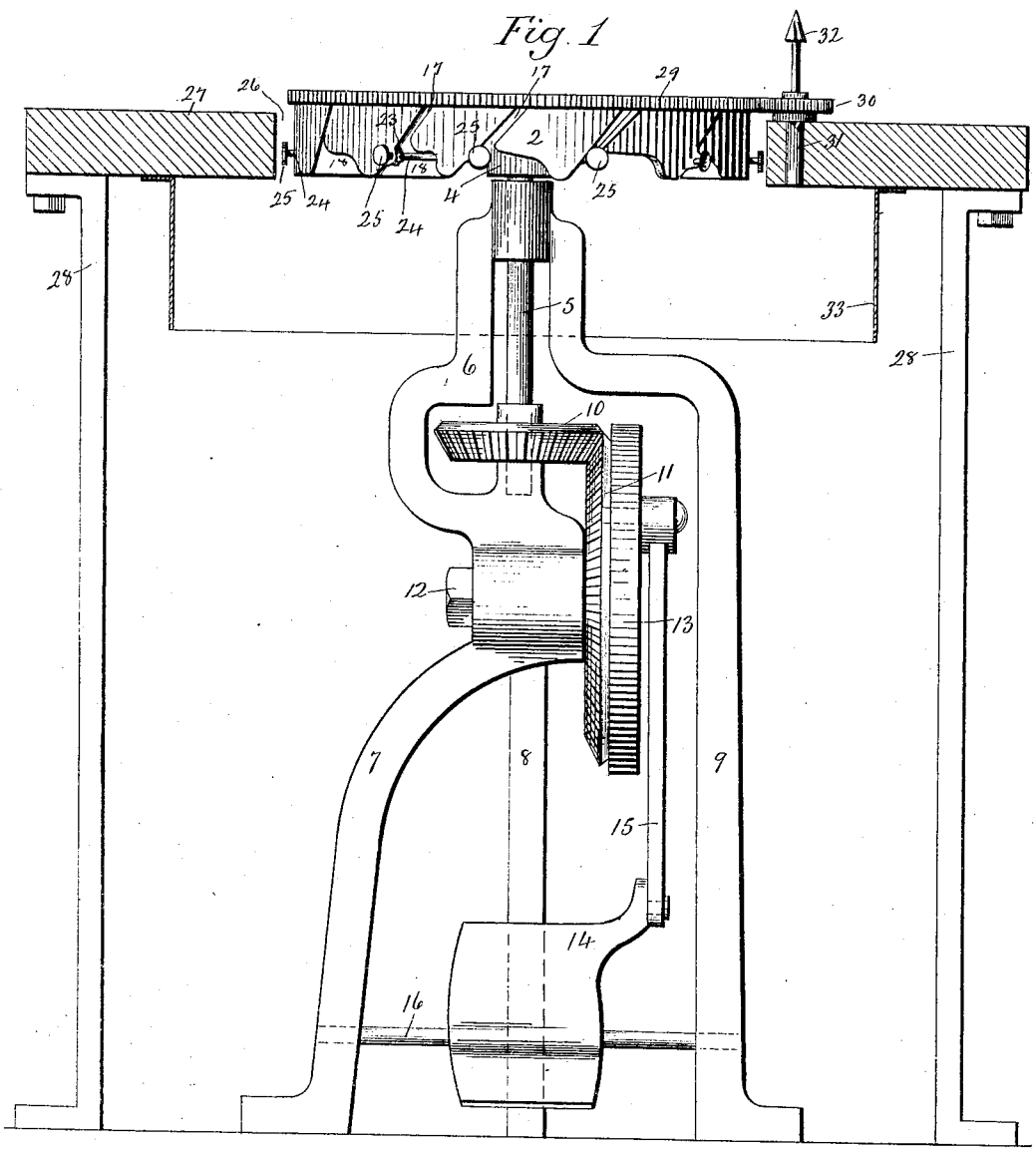

No. 767,733. PATENTED AUG. 16, 1904.
J. N. BUELL.
VEGETABLE PEELER.
APPLICATION FILED MAY 5, 1904.
NO MODEL.
2 SHEETS—SHEET 1.

No. 767,733. PATENTED AUG. 16, 1904.
J. N. BUELL.
VEGETABLE PEELER.
APPLICATION FILED MAY 5, 1904.
NO MODEL. 2 SHEETS—SHEET 2.
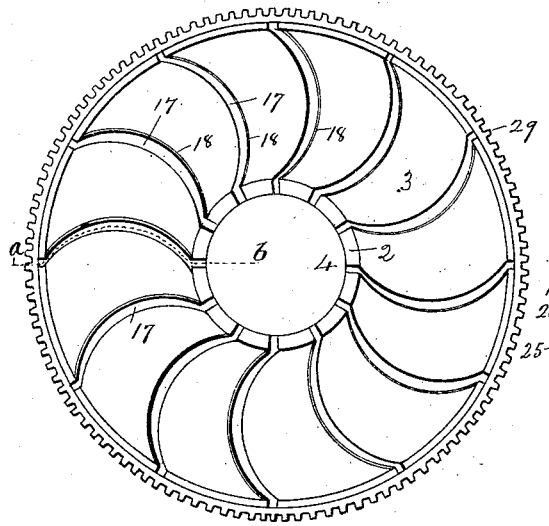
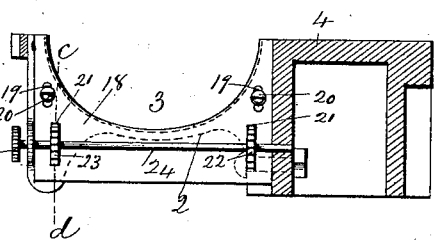
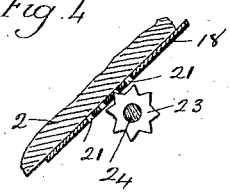
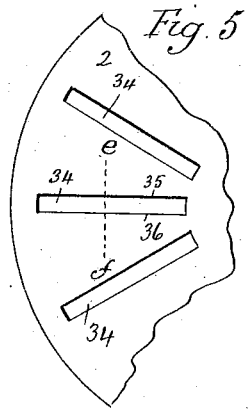

No. 767,733.

Patented August 16, 1904.

UNITED STATES PATENT OFFICE.

JOHN N. BUELL, OF WEST HAVEN, CONNECTICUT, ASSIGNOR OF ONE-HALF TO WILLIAM A. RUSSELL, OF WEST HAVEN, CONNECTICUT.

VEGETABLE-PEELER.

SPECIFICATION forming part of Letters Patent No. 767,733, dated August 16, 1904.

Application filed May 5, 1904. Serial No. 206,524. (No model.)

*To all whom it may concern:*

Be it known that I, JOHN N. BUELL, of West Haven, in the county of New Haven and State of Connecticut, have invented a new and useful Improvement in Vegetable-Peelers; and I do hereby declare the following, when taken in connection with the accompanying drawings and the figures of reference marked thereon, to be a full, clear, and exact description of the same, and which said drawings constitute part of this specification, and represent, in—

Figure 1, a side view of a vegetable-peeler constructed in accordance with my invention and in connection with a table, which is shown in section; Fig. 2, a top or plan view of the cutter-head detached; Fig. 3, a sectional view on the line $a\,b$ of Fig. 2; Fig. 4, a sectional view on the line $c\,d$ of Fig. 3; Fig. 5, a broken top or plan view of a modified form of head; Fig. 6, a sectional view on the line $e\,f$ of Fig. 5.

This invention relates to an improvement in a device for peeling vegetables, the object being to produce a device which may be run by hand, foot, or other motive power and at which one or more operators may be employed, and, while particularly adapted for use where a large number of vegetables are to be peeled, it is equally applicable for domestic purposes; and the invention consists in certain details of construction and combination of parts, as will be hereinafter described, and particularly recited in the claims.

In carrying out my invention I employ a horizontally-arranged head 2, formed with an annular trough or chamber 3 and provided with a central hub 4, adapted to be connected with a vertically-arranged spindle 5, by which the head may be rotated. As herein shown, this spindle is mounted in a frame 6, supported by legs 7, 8, and 9. On the spindle is a bevel-gear 10, meshing with a bevel-gear 11, mounted upon a stud 12, supported by the frame, the gear being connected with a fly-wheel 13, which also turns upon the same stud 12, and with this fly-wheel a pedal 14 is connected by a pitman 15, the pedal being mounted on a cross-bar 16 at the bottom of the frame. In the annular trough or chamber 3 are a series of slots 17, inclined to the transverse plane of the head, in which slots cutters 18 are secured, the edges of the cutters preferably extending slightly above the face of the trough, so as to act like the cutters of planes. These plates or cutters may be secured in any desired manner. As herein shown, the plates are formed with slots 19, through which screws 20 extend into the hub. To permit of the adjustment of the plates, they may be formed at opposite ends with notches 21, with which gears 22 23 may coact, the gears being mounted upon shafts 24, arranged parallel with the plates and provided at their outer ends with buttons 25, by which they may be turned.

The head 2 sets into an opening 26, formed in a table 27, which may be supported by legs 28 or in any other way, the edge of the head extending above the surface of the table and being preferably provided with an annular rack 29. This rack meshes with a pinion 30, carried by a spindle 31, mounted in the top of the table and so as be free to rotate therein, the upper end of the spindle being provided with a reamer-point 32. Depending from the under side of the table and surrounding the opening therein is an apron 33.

In operation the head 2 is rotated by means of the pedal 14 or otherwise, and as it revolves vegetables are held in the trough or chamber 3 and pressed against the surface thereof, so that as the head revolves the several blades 18 come in contact with the vegetables and cut the peel therefrom, the cuttings falling through the slots 17 and are deflected by the apron 33 so as to fall beneath the table. As the head revolves the spindle 31 is also turned, and the reamer-point 32 may be employed for removing the eyes or other specks from vegetables, it being understood that the number of these points may be arranged upon the table around the head corresponding in number to the number of operators to be employed.

Instead of using the blades 18 the head 2 may be formed from sheet metal, with comparatively wide radial slots 34, the edges 35 and 36 thereof being beveled or ground to form cutters. The head being revolved will cut in the same way as the cutters before described, except that with cutting edges at both sides of the slot the machine may be run in either direction.

Having fully described my invention, what I claim as new, and desire to secure by Letters Patent, is—

1. In a vegetable-peeler, the combination with a horizontally-arranged head formed in its upper face with an annular trough intersected by transversely-arranged slots, of cutters extending into said slots, and means for rotating the said head.

2. In a vegetable-peeler, the combination with a horizontally-arranged head formed in its upper face with an annular trough intersected by curved radial slots, of cutters extending into the said slots, and means for rotating the said head.

3. In a vegetable-peeler, the combination with a horizontally-arranged head formed in its upper face with an annular trough having transversely-arranged slots and provided with an externally-arranged annular rack, of cutters extending into the said slots, means for rotating the said head, a spindle provided with a spot-removing cutter, and a gear meshing with said rack for rotating the said spindle with the said head.

4. In a vegetable-peeler, the combination with a table having an opening, of a horizontally-arranged circular head located in the said opening, extending above the upper surface of the table and formed in its upper face with an annular trough intersected by transversely-arranged slots, cutters extending into the said slots, means for rotating the said head, and an apron secured to the under face of the table and depending therefrom.

In testimony whereof I have signed this specification in the presence of two subscribing witnesses.

JOHN N. BUELL.

Witnesses:
CLARA L. WEED,
J. H. SHUMWAY.